April 19, 1927.

J. DICK 1,625,194

FODDER CUTTER

Filed July 3 1925

4 Sheets-Sheet 1

Inventor

Joseph Dick, Deceased
C. F. Dick, Executors
Ferd. J. Zettler
By Frease and Bond
Attorneys

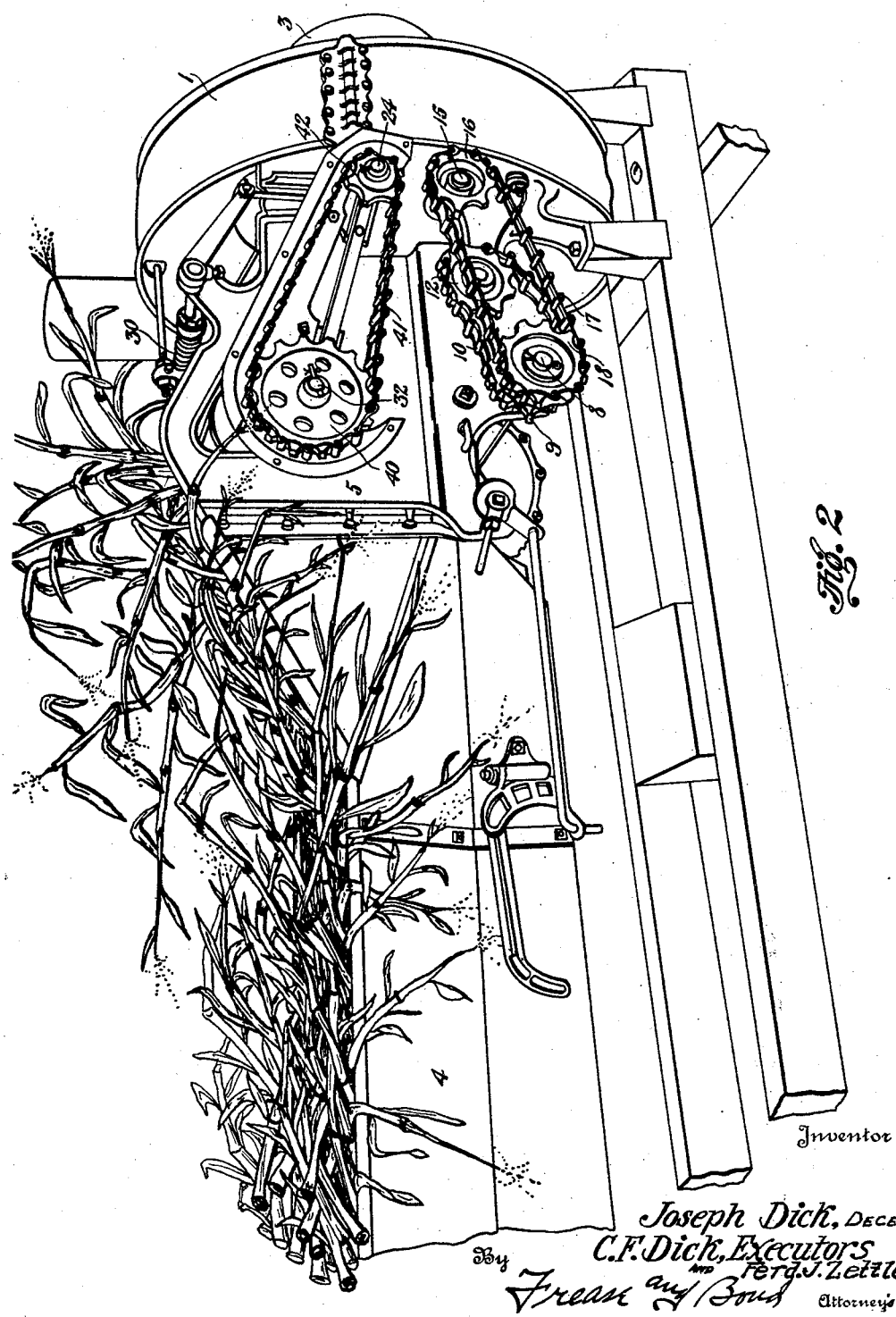

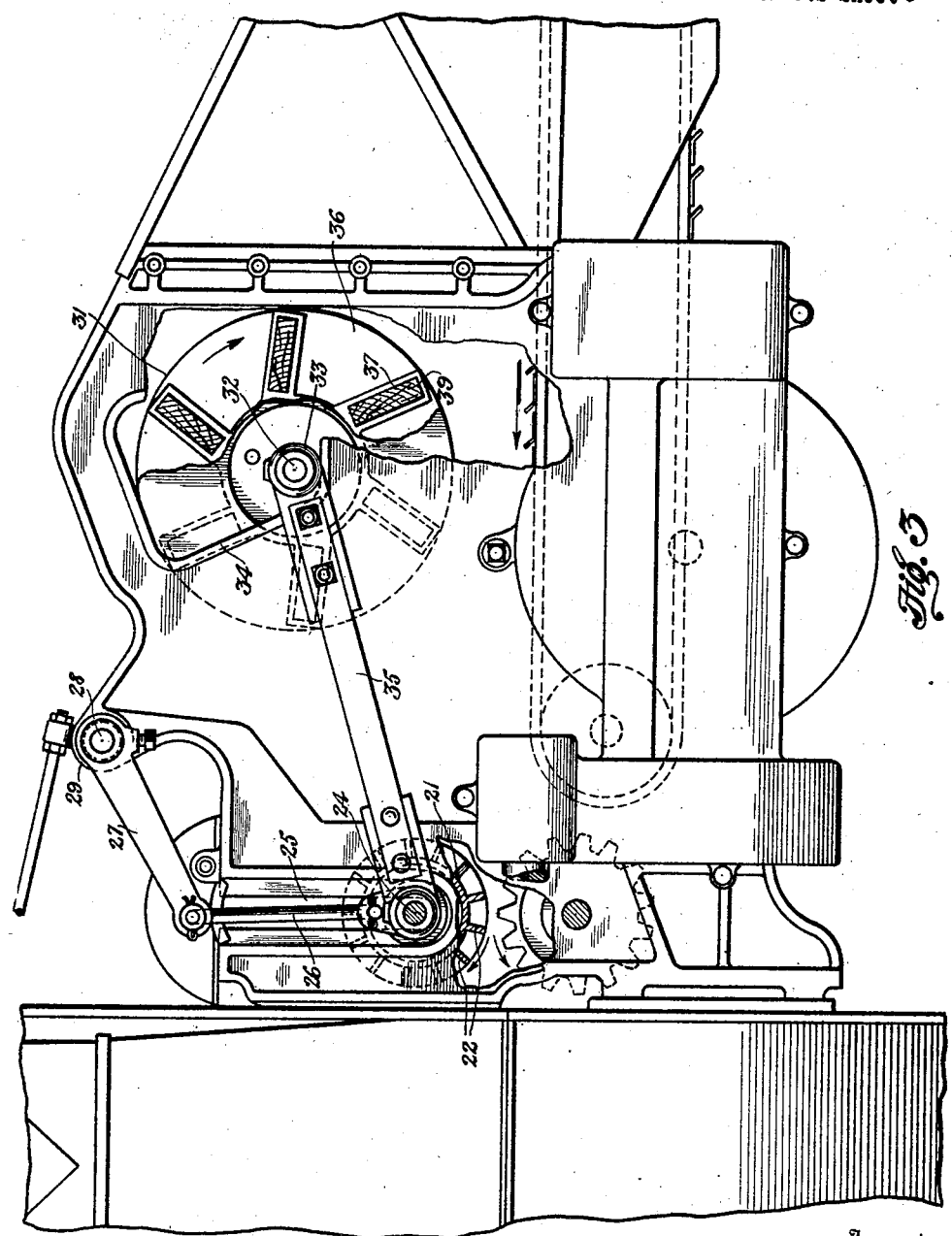

April 19, 1927.

J. DICK 1,625,194

FODDER CUTTER

Filed July 3, 1925     4 Sheets-Sheet 4

Inventor

Joseph Dick, Deceased
C. F. Dick, Executors
Ferd. J. Zettler
By Frease and Bond
Attorneys Patented Apr. 19, 1927.

1,625,194

UNITED STATES PATENT OFFICE.

JOSEPH DICK, DECEASED, LATE OF CANTON, OHIO; BY CHARLES F. DICK, EXECUTOR, OF CANTON, OHIO, ASSIGNOR TO THE JOSEPH DICK MANUFACTURING COMPANY, OF CANTON, OHIO, A CORPORATION OF OHIO.

FODDER CUTTER.

Application filed July 3, 1925. Serial No. 41,399.

This invention relates to fodder cutters, and more specifically to the feed mechanism in machines for cutting corn stalks and other forage of considerable length which is inclined to overhang the feed trough, tending to fall away from the feed mechanism; and the object of the improvement is to provide an accumulating or gathering roll co-operating with the feed hopper and the feed rolls, to gather in all of said overhanging stalks of fodder and carry the same into the feed rolls.

The above and ancillary objects may be attained by providing a fodder cutter or the like having a feed mechanism including a pair of co-operating feed rolls, one of which is movable toward or from the other roll to permit the forage to pass through the rolls without choking or bunching, a gathering or accumulating roll being located in advance of the feed rolls and provided with gathering paddles tangential to a hub-cylinder upon the roll, and arranged to move bodily in any direction within a limited space, independently of the movable feed roll, and co-operating with a conveyor belt or the like to gather in the stalks of fodder and feed them to the feed rolls.

Figure 1:
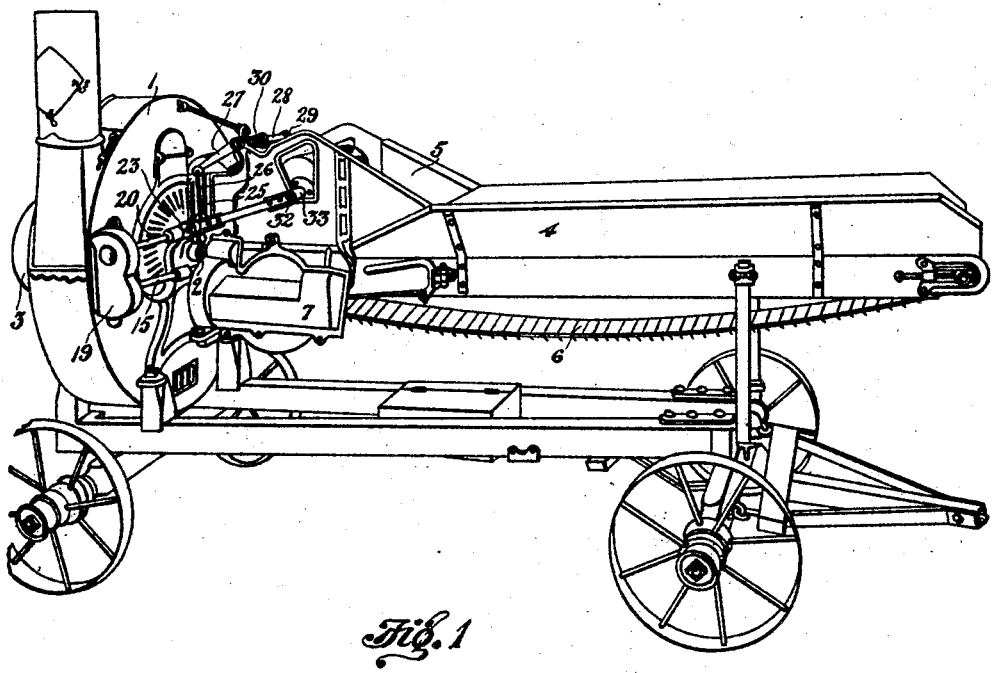
Figure 5:
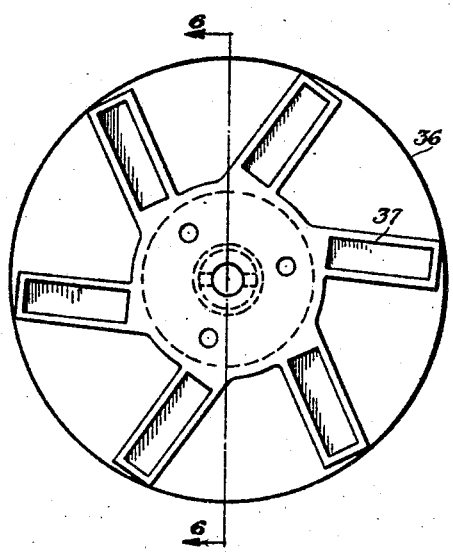
Figure 6:
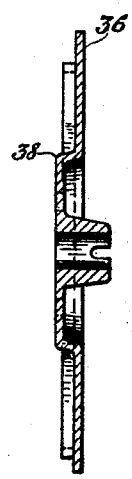
Figure 4:
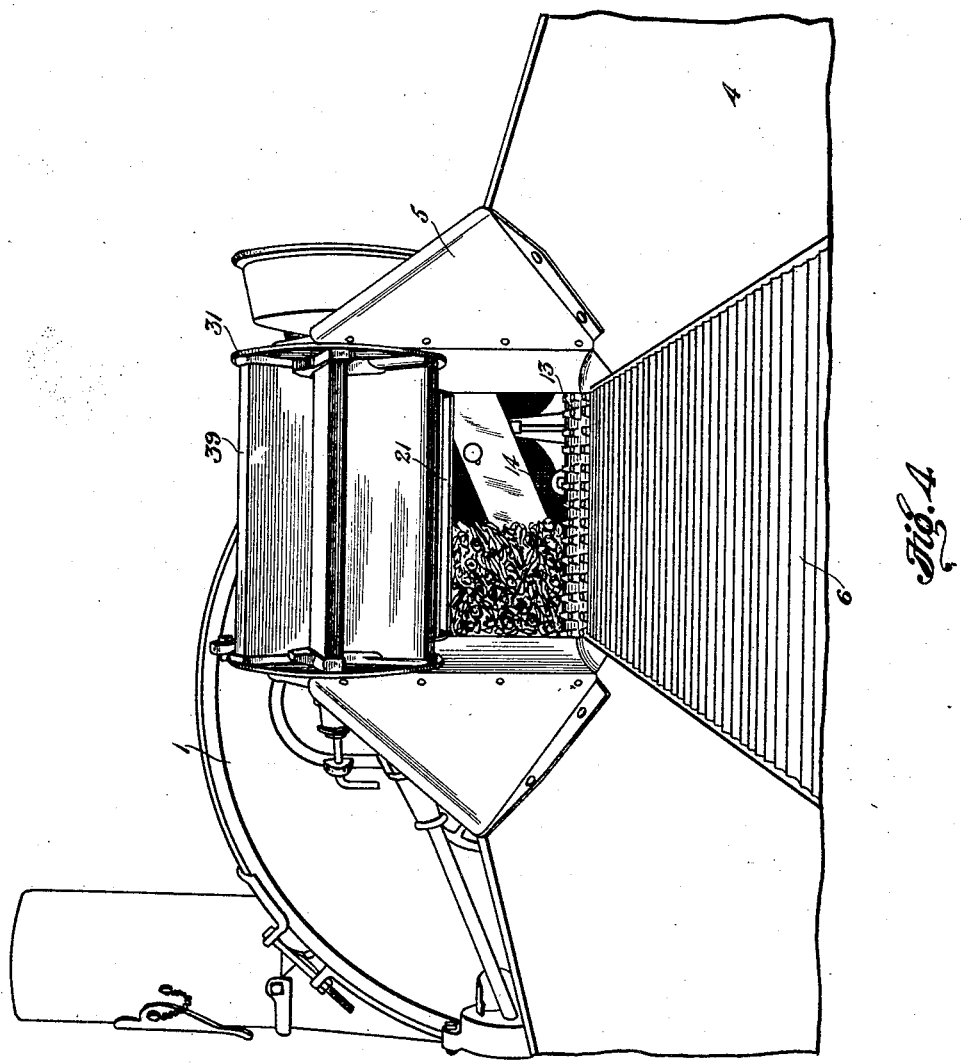

An embodiment of the invention thus set forth in general terms is illustrated in the accompanying drawings forming part hereof, in which:

Figure 1, is a perspective view of a fodder cutter embodying the invention;

Fig. 2, an enlarged perspective view of the opposite side of the feed portion of the fodder cutter;

Fig. 3, an enlarged side elevation of the feed portion of the fodder cutter, taken upon the same side of the machine as Fig. 1;

Fig. 4, a perspective view of the fodder cutter looking into the feed trough;

Fig. 5, an elevation of the inner side of one of the disks of the gathering or accumulating wheel, and Fig. 6, a section on the line 6—6, Fig. 5.

Similar numerals of reference indicate corresponding parts throughout the drawings.

The fodder cutter includes a case 1 having the usual cutting and blowing mechanism therein, rigidly mounted on the main shaft 2, which is axially journaled in the case and driven from any source of power through the drive pulley 3, and a feed trough 4 and feed hopper 5, having an endless conveyor belt 6 therein.

Suitable gearing within the gear housing 7 transmits power from the main shaft 2 to the feed drive shaft 8, a sprocket wheel 9 thereon being operatively connected as by the chain 10 to a sprocket wheel 11 upon the conveyor apron drive shaft 12.

The lower feed roll 13, which may be provided with the spikes or teeth 14 is journaled in stationary bearings within the throat of the feed hopper, the shaft 15 thereof being provided with a sprocket wheel 16 to receive power as through the chain 17, from the sprocket wheel 18 upon the drive shaft 8.

The shaft 15 of the lower feed roll extends beyond the other side of the feed hopper into a gear housing 19 within which is mounted suitable gearing to transmit power to the radially movable shaft 20 of the upper feed roll 21 which may be provided with the radial blades or paddles 22. A universal joint 23 connects the shaft 20 with the shaft 24 of the upper feed roll which shaft is mounted in bearings vertically movable within the guides 25 formed in the side walls of the feed hopper.

A link 26 connects each of the bearings of the shaft 24 with a rocker arm 27 carried by the rocker shaft 28 journaled in bearings 29 above the feed hopper, a coil spring 30 upon said shaft tending to normally urge the rocker arms 27 downward to move the upper feed roll toward the lower feed roll.

The accumulating or gathering roll, indicated generally at 31, is provided with a shaft 32 carried in bearings 33. The bearings of the gathering roll shaft are loosely mounted in quadrilateral openings 34, provided in the sides of the feed hopper, and which may be in the form of trapeziums, as illustrated. Each of the bearings 33 is connected by a link 35 with the shaft 24 of the upper feed roll, thus permitting free movement of the shaft 32 within the limits of the openings 34 and independently of the upper feed roll 21.

The gathering or accumulating roll preferably comprises two disks 36, fixed near opposite ends of the shaft 32, and provided on their inner faces with the sockets 37, substantially tangential to the hubs 38, paddles 39 being secured at their ends in said sockets, so as to incline the paddles forward and outward as the roll rotates.

For the purpose of driving the gathering or accumulating roll, a sprocket wheel 40 is mounted upon one end of the shaft thereof, and connected as by the chain 41 with a sprocket wheel 42 mounted upon the upper feed roll shaft 24. All of the parts are thus positively driven in the directions of the arrows shown in Fig. 3 of the drawing.

In operation, the fodder to be cut is thrown into the feed trough and carried forwardly into the feed hopper by the conveyor belt 6. As shown in Fig. 2, corn stalks or similar long plants, when piled indiscriminately into the feed trough, will overhang the sides of the trough, and as they are carried forward into the feed hopper by the conveyor belt there is a tendency for these stalks to fall outward or forward over the sides of the hopper and casing 1.

By providing the accumulating or gathering roll with the tangential paddles, and mounted as above described, all of these overhanging stalks are gathered in by the roll and passed into the feeding rolls; and since the upper feeding roll and the gathering roll are each movable independently of the other and are normally urged down upon the incoming material, the feeding roll by means of the spring 30 and the gathering roll by gravity, the material may be kept continuously moving through the feed mechanism without choking or clogging the same. As shown in Fig. 4, the upper feed roll may be raised to a considerable height above the lower roll to permit an excessive amount of fodder to pass through the rolls to the cutting mechanism.

By the forward inclination of the paddles of the gathering roll, any tendency to slip upon and push beneath the fodder is avoided; and as the stalks bend the rotating edges of the inclined paddles take hold of the fodder more or less positively, and gather and draw it down and under the gathering roll and advance it to the feed rolls.

I claim:

1. Feed mechanism for fodder cutters and the like, including a feed trough having a feed mechanism therein, and a gathering roll in advance of the feed mechanism, and provided with tangential paddles.

2. Feed mechanism for fodder cutters and the like, including a feed trough having a feed mechanism therein, and a gathering roll in advance of the feed mechanism, provided with tangential paddles and arranged for independent movement.

3. Feed mechanism for fodder cutters and the like, including a feed trough having a feed mechanism therein, and provided with openings in its sides in advance of the feed mechanism, and a gathering roll provided with tangential paddles and having a shaft extended into said openings and free to move vertically and horizontally therein.

4. Feed mechanism for fodder cutters and the like, including a feed trough having a feed mechanism therein, and a gathering roll in advance of the feed mechanism and comprising a pair of spaced disks and tangential paddles between said disks.

5. Feed mechanism for fodder cutters and the like, including a feed trough having a feed mechanism therein, and a gathering roll in advance of the feed mechanism and comprising a pair of spaced disks and tangential paddles between said disks, said gathering wheel being movable independently of the feed mechanism.

6. Feed mechanism for fodder cutters and the like, including a feed trough, a feed roll journaled in stationary bearings therein, a co-operating feed roll journaled in movable bearings and a gathering roll in advance of the feed rolls and provided with tangential paddles.

7. Feed mechanism for fodder cutters and the like, including a feed trough, a feed roll journaled in stationary bearings therein, a co-operating feed roll journaled in movable bearings, a gathering roll in advance of the feed rolls and provided with tangential paddles and a link connecting the movable feed roll and gathering roll.

8. Feed mechanism for fodder cutters and the like, including a feed trough, a feed roll journaled in stationary bearings therein, a co-operating feed roll journaled in movable bearings and a gathering roll in advance of the feed rolls and having tangential paddles, the trough having enlarged openings in its sides, a shaft for the gathering roll extended into said openings, and a link connecting the movable feed roll and gathering roll.

In testimony that I claim the above as executor of the last will and testament of Joseph Dick, deceased, I have hereunto subscribed my name.

CHARLES F. DICK,
*Executor of Joseph Dick, deceased.*